(12) United States Patent
Altman et al.

(10) Patent No.: US 10,078,571 B2
(45) Date of Patent: Sep. 18, 2018

(54) RULE-BASED ADAPTIVE MONITORING OF APPLICATION PERFORMANCE

(71) Applicants: International Business Machines Corporation, Armonk, NY (US); University College Dublin, Dublin (IE)

(72) Inventors: Erik R. Altman, Danbury, CT (US); Hitham Ahmed Assem Aly Salama, Dublin (IE); Nicholas M. Mitchell, Carmel, NY (US); Patrick Joseph O'Sullivan, Ballsbridge (IE); Andres Omar Portillo Dominguez, Dublin (IE); Peter F. Sweeney, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 14/963,939

(22) Filed: Dec. 9, 2015

(65) Prior Publication Data

US 2017/0168914 A1    Jun. 15, 2017

(51) Int. Cl.
  *G06F 11/00*    (2006.01)
  *G06F 11/34*    (2006.01)
  *G06F 11/30*    (2006.01)
  *G06F 11/07*    (2006.01)

(52) U.S. Cl.
  CPC ...... *G06F 11/3495* (2013.01); *G06F 11/0706* (2013.01); *G06F 11/076* (2013.01); *G06F 11/079* (2013.01); *G06F 11/302* (2013.01)

(58) Field of Classification Search
  CPC ............... G06F 11/079; G06F 11/0709; G06F 11/3006; G06F 11/3072; G06F 11/3495; G06F 11/0754
  See application file for complete search history.

(56) References Cited

U.S. PATENT DOCUMENTS

| | | | | |
|---|---|---|---|---|
| 5,787,409 A | * | 7/1998 | Seiffert | G06F 11/34 702/186 |
| 6,370,656 B1 | * | 4/2002 | Olarig | G06F 11/0721 709/201 |
| 7,120,685 B2 | * | 10/2006 | Ullmann | G06F 11/0709 709/224 |
| 7,661,032 B2 | | 2/2010 | Eberbach et al. | |
| 7,822,837 B1 | | 10/2010 | Urban et al. | |
| 8,140,911 B2 | | 3/2012 | Borghetti et al. | |
| 8,285,841 B2 | | 10/2012 | Oostlander et al. | |
| 8,452,786 B2 | | 5/2013 | Klinker et al. | |

(Continued)

FOREIGN PATENT DOCUMENTS

WO    2013023030    2/2013

OTHER PUBLICATIONS

Mell, P., et al., "The NIST Definition of Cloud Computing", NIST Special Publication 800-145, Sep. 2011, pp. 1-7.

*Primary Examiner* — Marc M Duncan
(74) *Attorney, Agent, or Firm* — Fleit Gibbons Gutman Bongini Bianco PL; Jon A. Gibbons

(57) ABSTRACT

A method for dynamically and adaptively monitoring a system based on its running behavior adjusts monitoring levels of the monitored application in real-time. A rules-based mechanism dynamically adjusts monitoring levels in real-time, based on the system's performance observed during a workload run, whether in a production or test environment.

14 Claims, 9 Drawing Sheets

(56) References Cited

U.S. PATENT DOCUMENTS

| | | | |
|---|---|---|---|
| 8,825,840 B2* | 9/2014 | Chung | G06F 21/552 709/224 |
| 2002/0183972 A1* | 12/2002 | Enck | G06F 11/3409 702/186 |
| 2004/0059966 A1* | 3/2004 | Chan | G06F 11/0709 714/48 |
| 2005/0060372 A1* | 3/2005 | DeBettencourt | H04L 43/028 709/206 |
| 2005/0182582 A1* | 8/2005 | Chen | G06F 11/3433 702/108 |
| 2008/0126828 A1* | 5/2008 | Girouard | G06F 11/3644 714/2 |
| 2008/0250265 A1* | 10/2008 | Chang | G06F 11/008 714/4.12 |
| 2010/0306597 A1* | 12/2010 | Goldszmidt | G06F 11/0709 714/47.1 |
| 2011/0047535 A1 | 2/2011 | Polakam et al. | |
| 2013/0158950 A1* | 6/2013 | Cohen | G06F 17/00 702/176 |
| 2013/0254833 A1* | 9/2013 | Nicodemus | G06F 21/55 726/1 |
| 2013/0297802 A1 | 11/2013 | Laribi et al. | |
| 2014/0007119 A1* | 1/2014 | Liu | G06F 9/54 718/102 |
| 2014/0143418 A1* | 5/2014 | Nakajima | G06F 11/3034 709/224 |
| 2014/0279918 A1* | 9/2014 | Han | G06F 11/366 707/648 |
| 2015/0163121 A1* | 6/2015 | Mahaffey | G06F 11/0766 707/687 |
| 2016/0149786 A1* | 5/2016 | Maltz | G06F 9/5027 709/224 |
| 2017/0161130 A1* | 6/2017 | Goldstein | G06F 11/079 |

\* cited by examiner

300

| Performance Goal | Monitoring Action | Node | Log Pts. |
|---|---|---|---|
| CPU Utilization - less than 70% | Increase {one level} | X,Y | 4-7, 12 |
| Access Response Time - less than 2 seconds | Increase {one level} | ALL | 1-3,8 |
| Deadlock - no occurrences | Increase {one level} | LDAP, - | 4,5 |
| Garbage Collection - up less than 5% | Increase {two levels} | - | 6-9 |
| Turn-around time - less than 2 seconds | Increase {one level} | - | 1-4 |
| Service availability - 95% | Increase to MAX level | - | 1-5 |
| Login failure - less than 1% | Increase {one level} | DB, - | All |
| Page load time - less than 1 second | Increase | - | 1,2,5 |

310 — Performance Goal
320 — Monitoring Action
330 — Node
340 — Log Pts.
325
335

*FIG. 3*

RULE-BASED ADAPTIVE MONITORING OF APPLICATION PERFORMANCE

BACKGROUND

The present disclosure generally relates to performance engineering, and more particularly relates to adaptive monitoring of application performance.

Performance engineering in today's large, distributed systems is a complex endeavor. Testing systems to meet performance requirements of response time, memory consumption, and CPU (central processing unit) time, all the while ensuring adherence to service level agreements, requires proficient use of monitoring tools. Performance test tools are used to record logs, or audit traces, and metrics such as CPU utilization, are used to record event details and application and/or system behavior during a run. A vital part of performance assessment, logging represents a real and substantial data overhead in this field, in the range of petabytes of data. As an example, a performance test run for an enterprise-grade architecture spans several days, monitoring the performance of several hundred servers handling 500 transactions per second, involving 100,000 concurrent users. The act of producing monitoring data including logging output and metrics adds to the workload and can affect application and/or system performance. When you consider that each server can feature multiple logging points and each logging point can generate terabytes of data, per day, it is easy to understand why log overhead has become a critical issue.

One cost-saving solution is to reduce monitor levels, or log or trace, levels. Monitoring levels refer to the level of detail in the output generated at logging points. Reducing monitoring levels can represent significant and substantial cost savings, cutting down on the monitoring data that must be stored, processed, and analyzed. Another benefit to reducing monitoring levels is lessening the impact of monitoring on application and/or system performance because less CPU cycles are diverted to monitoring functions. The downside to setting low monitoring levels is obvious—the loss of detail hinders the ability to debug any performance problems.

Customarily, in the event a performance issue is found, it becomes necessary to repeat the faulty scenario, albeit with higher monitoring levels, to identify and track the root cause of the problem. The general procedure is to stop the workload, increase the monitoring level, and rerun the hours-long or days-long test, hoping that the same problem will occur in the same node. This doesn't always happen because runs are randomized in a production environment.

BRIEF SUMMARY

In one embodiment, a method for adaptive performance monitoring of a system is disclosed. The method includes: setting rules for dynamically adjusting monitoring levels at logging points associated with multiple system nodes; and repeatedly performing, at pre-determined intervals during run-time: collecting monitoring data, comparing the collected data to performance goals, and adjusting monitoring levels. The rules specify, for each of the system nodes: at least one performance goal, and the monitoring level adjustment to perform when the performance goal is not met. The monitoring level adjustment increases the amount of monitoring data to capture more monitoring data used for debugging system performance issues.

In a further embodiment, the method for adaptive performance monitoring of a system automatically performs the monitoring adjustment by: determining that the performance metrics fail to meet the performance goal, indicating a performance issue; and increasing the monitoring levels for the system node exhibiting the performance issue.

In a further embodiment, the method for adaptive performance monitoring of a system includes changing monitoring options during run-time, responsive to determining that the performance metrics fail to meet the performance goal by a specified threshold amount. Changing the monitoring options can include: adjusting sampling size, adjusting the workload, adding logging points, and adjusting the collection intervals.

In another embodiment, an information processing system for adaptive performance monitoring is disclosed. The information processing system includes a memory and a processor communicatively coupled with the memory. The processor performs a method that includes: setting rules for dynamically adjusting monitoring levels at logging points associated with multiple system nodes; and repeatedly performing, at pre-determined intervals during run-time: data collection, comparison, and monitoring level adjustments. The rules specify, for each of the system nodes: at least one performance goal, and the monitoring level adjustment to perform when the performance goal is not met. The monitoring level adjustment increases the amount of monitoring data to capture more monitoring data used for debugging system performance issues.

In yet another embodiment, a computer program product for adaptive monitoring of a system is disclosed. The computer program product includes a storage medium readable by a processing circuit and storing instructions for execution by the processing circuit for performing a method. The method includes: setting rules for dynamically adjusting monitoring levels at logging points associated with multiple system nodes; and repeatedly performing, at pre-determined intervals during run-time: data collection, comparison, and monitoring level adjustments. The rules specify, for each of the system nodes: at least one performance goal, and the monitoring level adjustment to perform when the performance goal is not met. The monitoring level adjustment increases logging output to capture more monitoring data used for debugging system performance issues.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 illustrates one example of a rules repository, according to one embodiment of the present disclosure;

DETAILED DESCRIPTION

Figure 1:
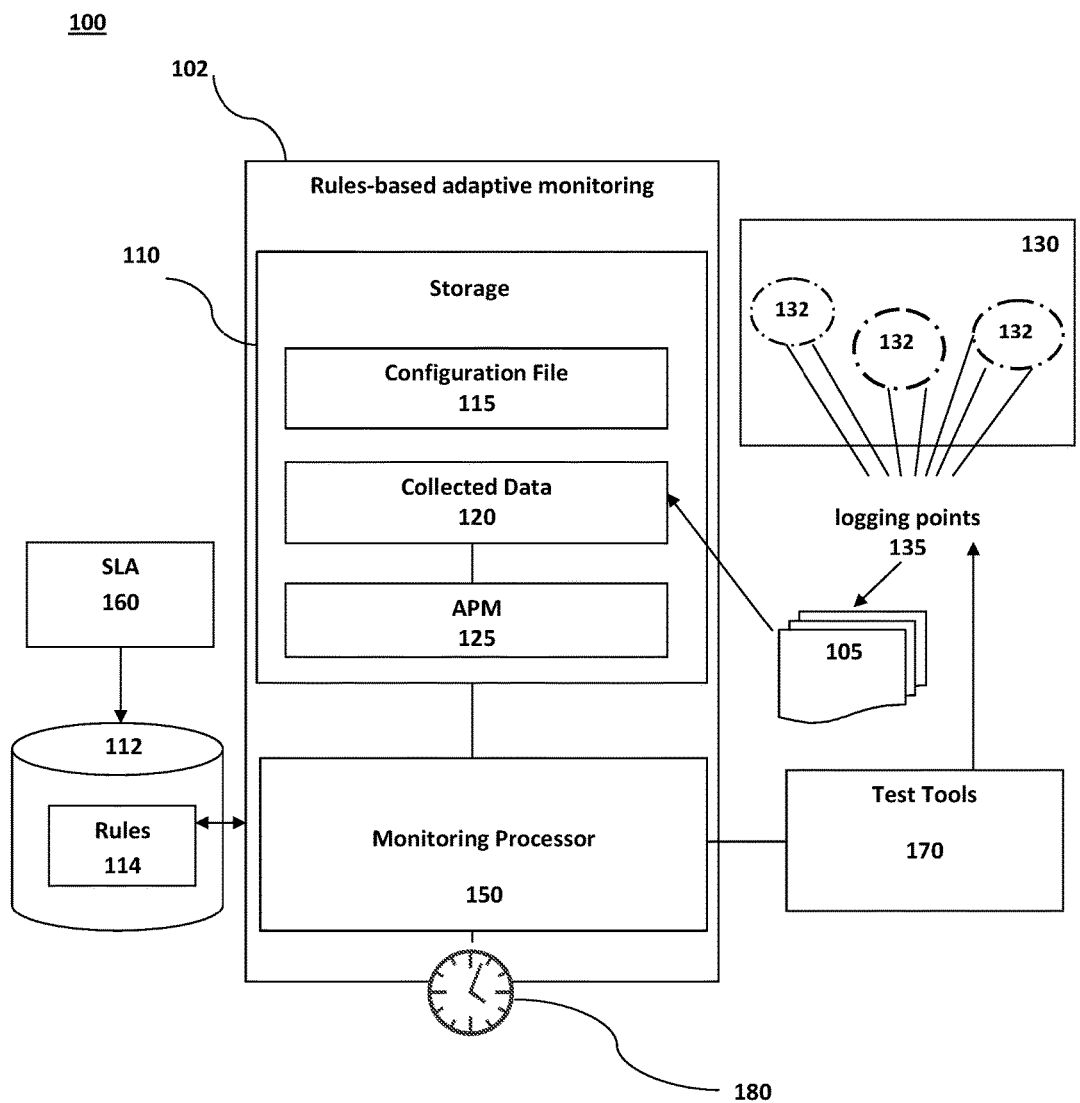
FIG. 1 is a block diagram illustrating one example of an operating environment according to one embodiment of the present disclosure.

Complex distributed systems include multiple inter-dependent sub-systems, distributed across a vast array of components, such as middleware, applications, configuration files, operating systems, virtual machines, and others, all collaborating to attain a quality of service goal. Monitoring applications are essential tools to support the quality of service provided to the end user. Monitoring serves several purposes, such as detecting anomalies, potential shortages of resources or performance bottlenecks; guaranteeing Service Level Agreements (SLAs) regarding the performance or availability of the system; simulating the behavior and generating synthetic load; and tuning the running system by drilling down into its components.

Performance test tools monitor performance metrics tied to quality of service objectives, such as average response time, under peak workload conditions. The performance test software observes the behavior of complex workloads, such as the volume of transactions processed by an application per second (tps), requests per second, and page loads per second. Due to the complexity of such workloads, a reliable and replicable deployment is not a simple task.

Monitoring levels (also called "log levels") must be set before running the application under test, in a trade-off between optimizing the tracking and debugging of bugs, and reducing any negative impact on system performance. Because high monitoring output can be extremely time-consuming, data-consuming, and can impact the performance of running applications, many administrators opt for initially setting minimum monitoring levels. Then, if a problem is reported, an attempt is made to replicate the problem by re-running the workload, with a higher monitoring level to produce more detail, hopefully uncovering the problem. In this common scenario, the workload has to be run at least one additional time, at an added cost and time delay, without a guarantee of replicating the problem because workloads are generally randomized.

In accordance with various aspects of the disclosure, a mechanism, system and method is disclosed for dynamically and adaptively monitoring an application's performance based on its running behavior, by adjusting monitoring levels of the monitored application in real-time. More specifically, a rules-based mechanism dynamically increases/decreases the monitoring levels of an application in real-time in order to capture more monitoring details, as indicated, based on the application's performance observed during a workload run, whether in a production or test environment.

If a transaction indicates a performance issue during a performance test run, the adaptive monitoring mechanism automatically adjusts monitoring levels at the affected node to record more monitoring details when this transaction occurs again in the same test run. Automatically adapting the monitoring levels during a workload improves the chances that the performance test tools will capture the details and information necessary to debug a problem because log detail is most useful when it is recorded as close as possible to the error occurrence.

For example, an adaptive decision to increase monitoring levels is taken if transaction performance levels fail to meet a pre-defined threshold level as provided in a Service Legal Agreement (SLA). In this case, the adaptive monitoring system, according to embodiments of the disclosure, trigger the capture of more detailed monitoring data, at the level required to include sufficient detail for debugging. After a period of time, the adaptive monitoring system allows for the monitoring levels to revert to their initial low levels. In this manner, the adaptive monitoring mechanism generates a high level of detail, but only when needed, and only at the relevant node or nodes, at the relevant time.

When monitoring is enabled, the performance tester sets the monitoring level, or level of detail and output format for a report (such as a log), for each component, or system node, under observation. The level of detail, or monitoring level, specifies the amount of detail to include in the log output. Monitoring levels are tied to the severity of system errors and vary in the amount of detail provided at each logging point, from no output to a high level of detail. In some cases, a low monitoring level provides the minimum amount of information, basically reporting on task progress. The highest monitoring levels provide the most verbose level for debugging problems. The detail included in monitoring output varies not only by level, but by the node, or component, for which it is reporting. For example, an IBM Websphere® Application Server can indicate twelve monitoring levels, whereas many other systems rely on five or six monitoring levels.

Logging points, also called audit points, are associated with a system node and write to an audit log (sometimes called a trace log) when a specified event/activity occurs with regard to that system node. Logging points are monitored by performance test tools and can be set for a process, an event, a transaction, or any activity type that involves a system node. As a non-limiting example, database audit or logging points write a basic message to an audit log when a process: 1) is defined; 2) is requested; 3) is requested to link; 4) is acquired; 5) completes; 6) is reset; 7) is canceled; 8) is suspended; and 9) is resumed. Although the above example is presented in the context of database audit points, the principles may equally be applied to other logging points for other systems and/or subsystems. A logging point can be a simple script log, such as ScriptLog file-path.

Logging points extract raw monitoring data from the application or system on which the application is running. Some examples of monitoring data are: a) audit data, such as who and when a configuration parameter of the system is changed; b) transaction (or request) data which measure logical units of work at the application level; c) performance data, such as CPU and memory utilization; d) analytical data, such as page load times for a Web server; and e) event data, such as logging a call to a login service and its return code of success or failure.

For purposes of this disclosure, a system node is any addressable component, application, or process that forms a part of an information processing system under test. A system node can include a server, such as a Web server; a network of servers; a directory such as an LDAP directory; a database; an application; a device such as a printer; and/or a process, to name a few. In a distributed system it is especially advantageous to set multiple logging points across nodes because a failure in one system node can cause a performance-degrading condition in another system node.

In a complex production system featuring hundreds of servers, and several thousand logging points, the data costs of high monitoring levels become readily apparent. Enormous cost savings are provided by employing the adaptive monitoring mechanism to only adjust the affected logging points, and only for a specified period of time, then bringing the monitoring levels back to their initial low levels if the problem does not persist.

According to embodiments of the present disclosure, the adaptive monitoring system is rules-based, meaning that all monitoring actions performed on the running system are performed dynamically, based on a configuration set and monitoring parameters that are specified before the workload begins.

Operating Environment—FIG. 1

Referring now to FIG. 1, there is shown a simplified illustration of an exemplary operating environment 100 implementing the adaptive monitoring mechanism, according to one embodiment of the present disclosure. The operating environment 100 includes an adaptive monitoring system 102 configured to implement rules-based adjustments to monitoring levels on nodes 132 of a system 130. The adaptive monitoring system 102 is configured to operate in a test or production environment and includes a monitoring processor 150 configured for adjusting monitoring levels, and storage 110 configured for storing raw monitoring data 105 generated by the logging points 135, such as audit, transaction, analysis, performance, and event data.

The monitoring data 105 is stored in collected data store 120. Throughout this disclosure, we use the term "application performance metrics" or APMs 125 to mean the derived performance parameters used to compare application and/or system behavior against a performance goal as stated in the rules repository 112. Statistics are applied to the monitoring data 105, as specified in the configuration file 115, to compute APMs 125. Some monitoring data 105 are collected as averages. As an example, the APM 125 "access response time" is computed as the average of the access response times over the collection time interval. As another example, CPU utilization is an average CPU usage over time. Stated differently, APM 125 is the collected raw data term "monitoring data 105" after it has undergone analysis by the monitoring processor 150 to derive a performance metric to compare against a performance goal.

The monitoring data 105 is analyzed by the monitoring processor 150 after collection to derive the APM 125 used by the monitoring processor 150 to evaluate system performance and adjust monitoring levels accordingly. As an example, monitoring data 105 can include the timestamps for a process start and a process end. After analysis, the monitoring processor 150 derives an APM 125 of response time from the timestamps. This APM 125 is used to compare against a rule 114 specifying a stated performance goal for response times.

In one embodiment depicted in FIG. 1, the monitoring processor 150 is in operative communication with the rules repository 112 stored remotely and accessible to other systems. The rules repository or database 112 stores a set of one or more rules 114 governing the changes in monitoring levels for each node 132 under evaluation. One with knowledge in the art can appreciate that the rules repository 112 can be included within storage subsystem 110. The rules set 114 stored in the rules database 112 specifies the upper/lower bounds for performance goals for each node 132, mapped to the requisite monitoring action to take when the performance goal is not met. Additionally, the rules 114 can specify the length of time to maintain the increased monitoring level, after which the monitoring level reverts to its initially low default level.

The rules 114 can be expressed in terms of business rules tied to a SLA 160 by specifying the expected performance goals as set out in the SLA 160. For example, assume a SLA 160 mandates an access response time of less than two seconds. In this scenario, the rules 114 are specified so that reporting access response times of two seconds or more triggers a rule failure scenario increasing monitoring levels at logging points 135 for the affected system node 132.

When an expected performance goal is not met, the monitoring processor 150 triggers an increase in monitoring levels. For example, the rule for "CPU utilization less than 70%" specifies a performance goal for the APM 125 for monitoring data 105 reporting on system performance. The rule for "turn-around-time less than 2 seconds" and "access response time less than 2 seconds" specify performance goals for the APM 125 for the analytical aspect of monitoring data 105. The rule for "login failure less than 1%" specifies a performance goal for the APM 125 for monitoring data 105 reporting on events.

In one embodiment, the rules 114 can also specify the number of monitoring levels to adjust. For example, the rules 114 may specify under what conditions the monitoring level should increase by one level, or two levels, or three levels, and so forth. Or, the rules 114 can state that the monitoring level should increase to the maximum level for that node 132. In one embodiment, the rules 114 can specify the actual monitoring level to use, such as "if condition, go to monitor level=fine "or" if not condition, go to monitor level=info." If no specific level increase is indicated, the default is one level. It will be appreciated that different nodes support different monitoring levels, and any examples provided are non-limiting examples, presented for clarity of understanding.

In one embodiment, the configuration file 115 includes the configuration parameters governing the use of the adaptive monitoring system 102. For example, the configuration file 115 can specify the default monitoring levels and the frequency and duration of the collection of monitoring data 105, among other parameters. The configuration file 115 can specify that a default monitoring level is zero, meaning that monitoring is disabled, or it can specify that a default monitoring level is the minimum level for that node 132. The configuration file 115 can also be stored in storage 110. The system nodes 132 that are to be monitored are also specified in the configuration file 115.

The configuration file 115 and rules set 112 are depicted as separate blocks for clarity of presentation, although it is understood that the blocks are not to be construed as logical or physical separations. The rules set 112 and configuration parameters can be stored in one or more logical or physical components. It will also be appreciated that the rules set 112 and the configuration file 115 can be stored in remote storage. This represents an advantageous configuration in an enterprise-grade environment with different teams working remotely on joint projects and contributing to the knowledge base by adding/updating rules 114 as necessary.

The interval timer 180 is operably coupled with the monitoring processor 150 and can be embodied as a system clock or global clock. The timer 180 is implemented by the monitoring processor 150 to schedule collections of monitoring data 105 at pre-set intervals, as per the stored parameters in the configuration file 115. Once the monitoring data 105 is collected at pre-specified time intervals, the monitoring processor 150 analyzes the monitoring data 105 to derive APM 125 by applying statistics to determine system performance. For example, transactional data, as part of the monitoring data 105, is collected and analyzed to determine performance data 125 such as average response time and throughput. The rules 114 are then invoked to increase/decrease monitoring levels at any affected logging points 135.

Various performance monitoring tools 170 are available to observe the behavior of complex workloads. The monitoring processor 150 is configured to seamlessly integrate with performance monitoring tools 170 in order to enable the increase/decrease of monitoring levels for the affected node 132. Various performance monitoring tools 170 are in widespread use today, such as HPE LoadRunner® (load testing software), IBM's Rational® Performance Workbench Agent (a load and performance testing tool), Microsoft's MSTest® (command line utility test tool), and Segue's QA (tool for tracking software bugs). The performance monitoring tools 170 specify the various applications under monitoring, and their associated monitoring software.

From the logging points 135, we collect the monitoring data 105 (audit, transaction, performance, analytical, and event) in time intervals that are specified by the configuration file 115. Once the monitoring data 105 is collected as raw data, as per the parameters set in the configuration file 115, and stored in collected data store 120, the monitoring processor 150 analyzes the monitoring data 105 to derive APMs 125 to compare to the application performance goals defined in the rules 114. As an example, a logging point 135 at a Web Server node 132 provides analytical monitoring data 105 regarding page load times. By averaging the page load times collected during the data collection period, the monitoring processor 150 derives APM 125 to compare against the performance goal specified in the rules 114, shown in FIG. 3.

Figure 2:
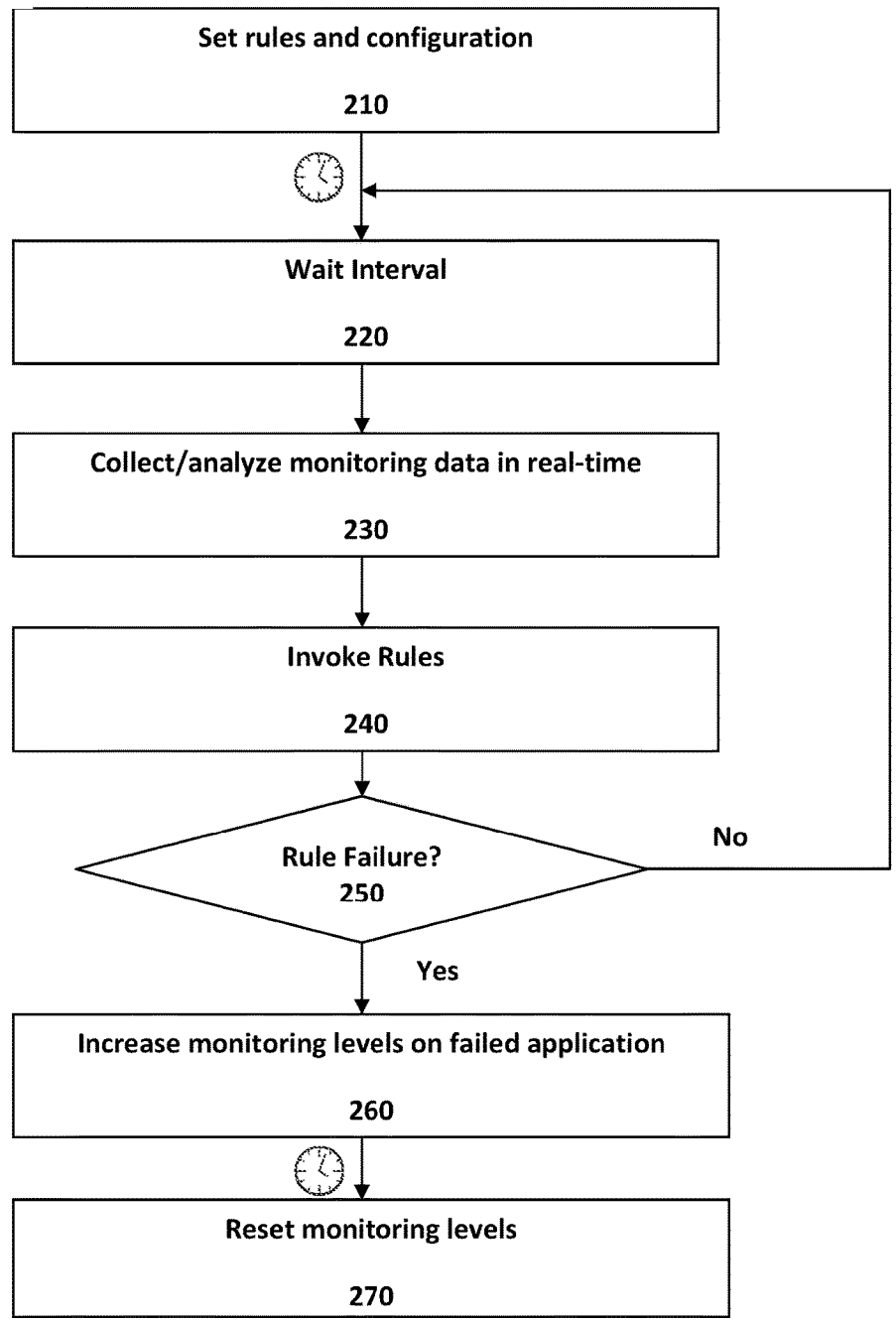
FIG. 2 is an operational flow diagram illustrating a process for rules-based adaptive monitoring, according to one embodiment of the present disclosure.

Operational Flow Diagram—FIG. 2

FIG. 2 depicts a flowchart 200 of a rules-based adaptive monitoring process, according to one embodiment of the present disclosure. The operational flow begins at step 210, setting the monitoring output rules 114 for each designated logging point 135 at each designated system node 132 to be monitored, before the test or production run begins. The wait intervals and frequency of data collection can be provided in the configuration file 115. In step 220, a hold time period must elapse before the Interval Timer 180 prompts a collection of monitoring data 105.

After the wait interval ends, in step 230 the monitoring processor 150 collects monitoring data 105 from logging points 135 at various designated nodes 132 and analyzes the monitoring data 105 in real-time, during the test or production run. The monitoring data 105 that is collected can represent performance data, audit data, analytical data, transactional data and/or event data for each system node 132 under evaluation. The type and quantity of monitoring data 105 to collect can be specified in the configuration file 115, and tailored to the system 130 under test. After collection, the monitoring processor 150 applies statistics specified in the configuration file 115 to generate APMs 125.

The monitoring processor 150 invokes the rules 114 in step 240 to determine, from the analysis, if a rule failure has occurred. For example, referring to FIG. 3, the rules 114 specify a performance goal 310 for page load of less than one second. Decision step 250 determines if a rule failure has occurred by comparing the APM 125 derived from the monitoring data 105 collected in step 230 to the performance goals 310 set forth in the rules 114. As an example, assume the data analysis performed at step 230 returns an APM 125 for average page load time of 2.5 seconds. The rules 114 specify a performance goal 310 with a threshold of less than 1 second. The comparison performed at step 250 by the monitoring processor 150 returns a rule failure, indicating that a performance issue has been detected and monitoring levels need to be increased for any affected nodes 132, which in this case is the Web server node 132. Certain rule failures may call for monitoring level increases at more nodes 132 than just the one exhibiting the failure.

When the monitoring processor 150 returns a rule failure in step 250, then in step 260 the monitoring levels for the logging points 135 at the system node 132 exhibiting the performance issue are automatically increased to enable more insight into what caused the rule failure, without having to stop the workload and re-run it. Once monitoring levels have been increased, after a set amount of time, in step 270 the monitoring levels are reset to their initial levels so as not to deleteriously affect system performance.

If, however, the monitoring processor 150 at step 260 does not return a rule failure, no monitoring adjustments are made and the processing loops back to step 220 to wait for the next time interval for data collection.

Figure 4:
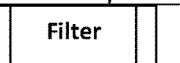
FIG. 4 illustrates a filter example, according to one embodiment of the present disclosure.

Rules Examples—FIGS. 3 and 4

In accordance with various aspects of the disclosure, the rules 114 at their simplest specify a performance goal to achieve and the monitoring action to take when that performance goal is not met. In one embodiment the rules 114 can be expressed as commands or scripts, in the form of "If {condition} perform {action}." FIG. 3 is a simplified example of a set of rules 114, illustrated as a table 300, according to one embodiment of the present disclosure. The table 300 as shown features rules 114 expressed as {performance goal, logging action} pairs 325. SLA metrics define a quantifiable performance target 310 to achieve, such as "CPU utilization rate less than 70%." The monitoring actions 320 define the required change in monitoring level, such as "increase log level."

In one embodiment, the rules 114 are expressed as pairs 325 and specify a performance goal 310 and a monitoring action 320 to perform in the event of a rule failure. FIG. 3 also illustrates an option wherein the rules 114 specify a triple 335 of {performance goal, monitoring action, node}. The node 330 specifies the system node 132 for which to increase the monitoring level when the performance goal is not met. If no node 330 is specified (shown as a "–"), the default is to increase monitoring levels on only the node(s) 132 reporting the rule failure. However, in some circumstances, it is useful to explicitly identify the specific nodes 132 on which to increase monitoring.

For example, assume a deadlock occurrence was noted at systems x and y, both attempting to access the LDAP server. A deadlock, for purposes of this discussion, occurs when two threads attempt to access the same resource at the same time, while each thread is holding a lock the other thread needs to make progress. In this deadlock scenario, the default rule 114 calls for an increase in monitoring levels on systems x and y, the affected systems, or nodes 132 reporting the deadlock. In the example of FIG. 3, a "−" identifies the specific nodes violating the rule 114. However, in this situation, an extension to the rule 114, adding a call for more detail from the LDAP server, as well as nodes x and y, may yield more valuable information. The node 330 in the triple 335 can specify a specific system or sub-system, or it can more generally refer to a class of systems. For example, the node 330 may specify the LDAP server in particular, or all database servers.

In one embodiment, it will be appreciated that the rules 114 can further include a reference 340 to the particular logging points 135 on which to focus within the specified node 132. For example, the rules 114 can specify that only certain logging points 135 at the node 132 that exhibited the rule failure are to have their monitoring levels adjusted.

FIG. 4 shows a rules table 400 with a filter 414, according to an embodiment of the disclosure. Up to now only simple rules have been discussed. A simple rule can be described as "if x happens, perform y." However, complex systems sometimes require complex rules. In one embodiment, we add a filter 414 to the rule set 114 to produce complex rules. The filter 414 incorporates additional processing, depending on the severity of the rule failure. The filter 414 expands on the simple rule by adding another requirement. For example, the simple rule for CPU utilization states that CPU utilization must be less than 70%. The filter 414 adds an additional computation in the event of a rule failure. Now, the rule becomes a complex rule, requiring further processing, based on threshold levels.

Figure 5:
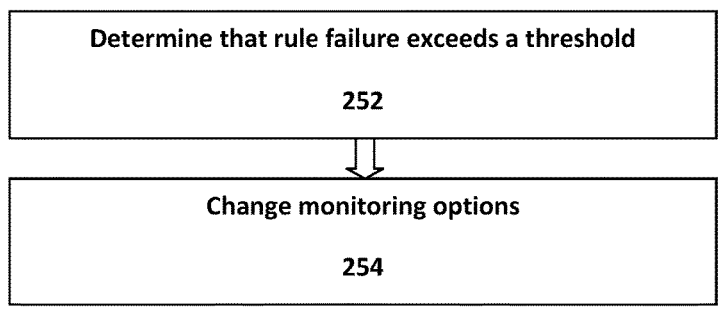
FIG. 5 is an operational flow diagram illustrating a process for complex rules, according to one embodiment of the present disclosure.

Rules Filter Processing—FIG. 5

FIG. 5 shows an operational flow diagram 500 providing an example of the filter processing, according to one embodiment. In step 252, after confirming a rule failure, the monitoring processor 150 performs additional processing to determine if the derived APM 125 varied from the performance goal 310 by a pre-specified threshold value. For example, assume the rule 114 sets a CPU utilization rate of less than 70%; meaning that anything above that threshold is considered a rule failure. That is a simple rule; if CPU utilization is measured as 75%, the monitoring processor 150 returns a rule failure.

For a complex rule, however, the analysis does not end there. In the case of complex rules, if CPU utilization is not less 70%, the monitoring processor 150 then applies the filter 414 to determine if CPU utilization is 90%, considerably above the rule threshold. If that is the case, in step 254 the monitoring processor 150 executes a further change in monitoring options, such as 1) very aggressively adjusting the monitoring levels with logging turned up to maximum levels; 2) alerting the administrator; and/or 3) shortening wait intervals to increase the frequency of data collection, to name a few. In one embodiment, the filter 414 processing for complex rules is only invoked upon a rule failure.

Figure 6:
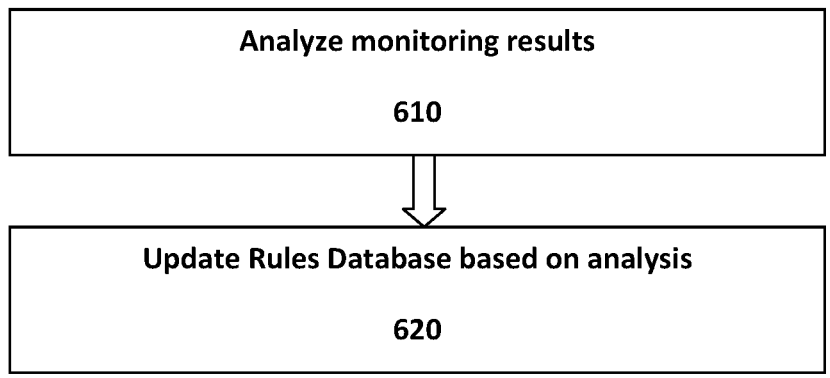
FIG. 6 is an operational flow diagram illustrating a process for updating the rules repository, according to an embodiment of the present disclosure.

Operational Flow for Adaptive Feedback Learning Process—FIG. 6

FIG. 6 shows an operational flow diagram 600 for an adaptive feedback learning process, according to an embodiment. In step 610, the results of the adaptive monitoring system 102 are analyzed with a view towards fine-tuning the system 130 based on learned behavior. In step 620 the rules set 114 is updated based on the results analysis. For example, an analysis may uncover that deadlock issues were seen sporadically throughout a production run, and increasing monitoring output by one level did not yield enough information to debug the problem because it happened so infrequently. An administrator may then consider changing the rules 114 to increase monitoring levels to the maximum at all nodes 132 if deadlock reoccurs.

In one embodiment, the rules 114 can be updated to change the logging points to adjust, based on analysis of the performance data 120. For example, the adaptive monitoring system 102 can "learn" which logging points 135 per node 132 produce the best results at varying monitoring levels, where "best results" can mean producing the optimal amount and quality of data for debugging. Once learned, the adaptive monitoring system 102 can calibrate the rules 114 accordingly. The above non-limiting examples of rules updates are provided for clarity of understanding and not intended to be an exhaustive list. One with knowledge in the art will appreciate that other changes to monitoring parameters can be made within the spirit and scope of the disclosure.

Figure 7:
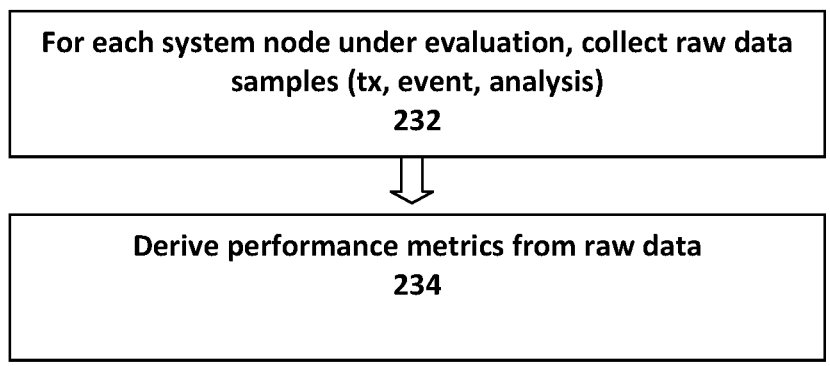
FIG. 7 is an operational flow diagram illustrating a process for monitoring data collection and analysis, according to an embodiment of the present disclosure.

Operational Flow for Evaluation of Monitoring Data—FIG. 7

FIG. 7 shows an operational flow diagram 700 for collecting and analyzing the monitoring data 105 in real-time, from step 230 in FIG. 2. In step 232, for each system node 132 under evaluation, the adaptive monitoring system 102 collects raw monitoring data 105 for a specified period of time. Some non-limiting examples of raw data 105 to collect are: request received timestamp, response delivered timestamp, and CPU usage level. In step 234 the raw monitoring data 105 is distilled to derive APMs 125 used to invoke the rules 114 in step 240. In one example, the APM 125 for access response time is derived from comparing the request received timestamp with the response delivered timestamp. This provides the APM 125 for response time which is then averaged for all transactions during the collection period. It will be appreciated that this is just one example provided for clarity of understanding and should not be construed as limiting the disclosure in any way.

Figure 8:
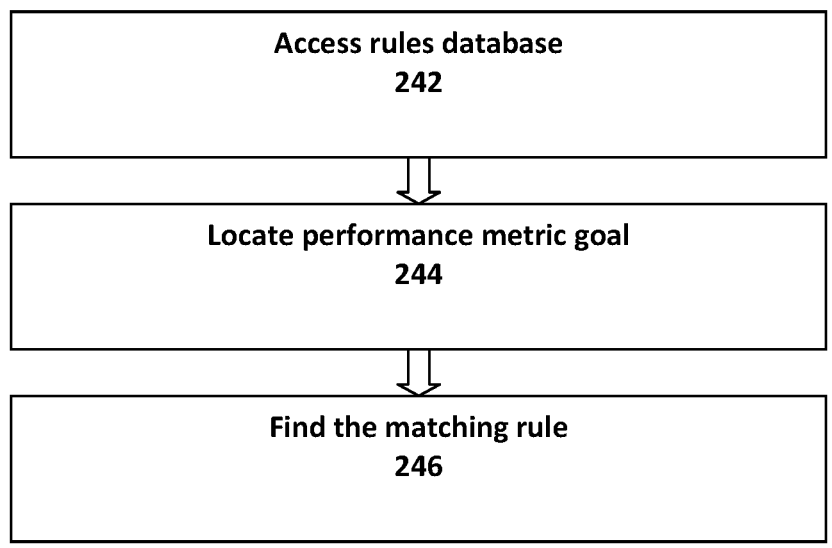
FIG. 8 is an operational flow diagram illustrating a process for invoking the rules, according to an embodiment of the present disclosure.

Operational Flow for Invoking the Rules—FIG. 8

FIG. 8 shows an operational flow diagram 800 for invoking the rules 114 from step 240 in FIG. 2. In step 242 the rules database 112 is accessed. In step 244, the performance goal 310 for each performance parameter 325 to evaluate (e.g. average response time) is located. Once the performance parameter 325 is located in the rules 114 (e.g. average response time<2 seconds), the matching monitoring action 320 is found in step 246 (e.g. increase monitoring levels by one level). A performance metric goal 310 that is not met is considered a rule failure.

It is anticipated that the adaptive monitoring system 102 will increase its utility over time with continual propagation and calibration of the rules database 112.

Figure 9:
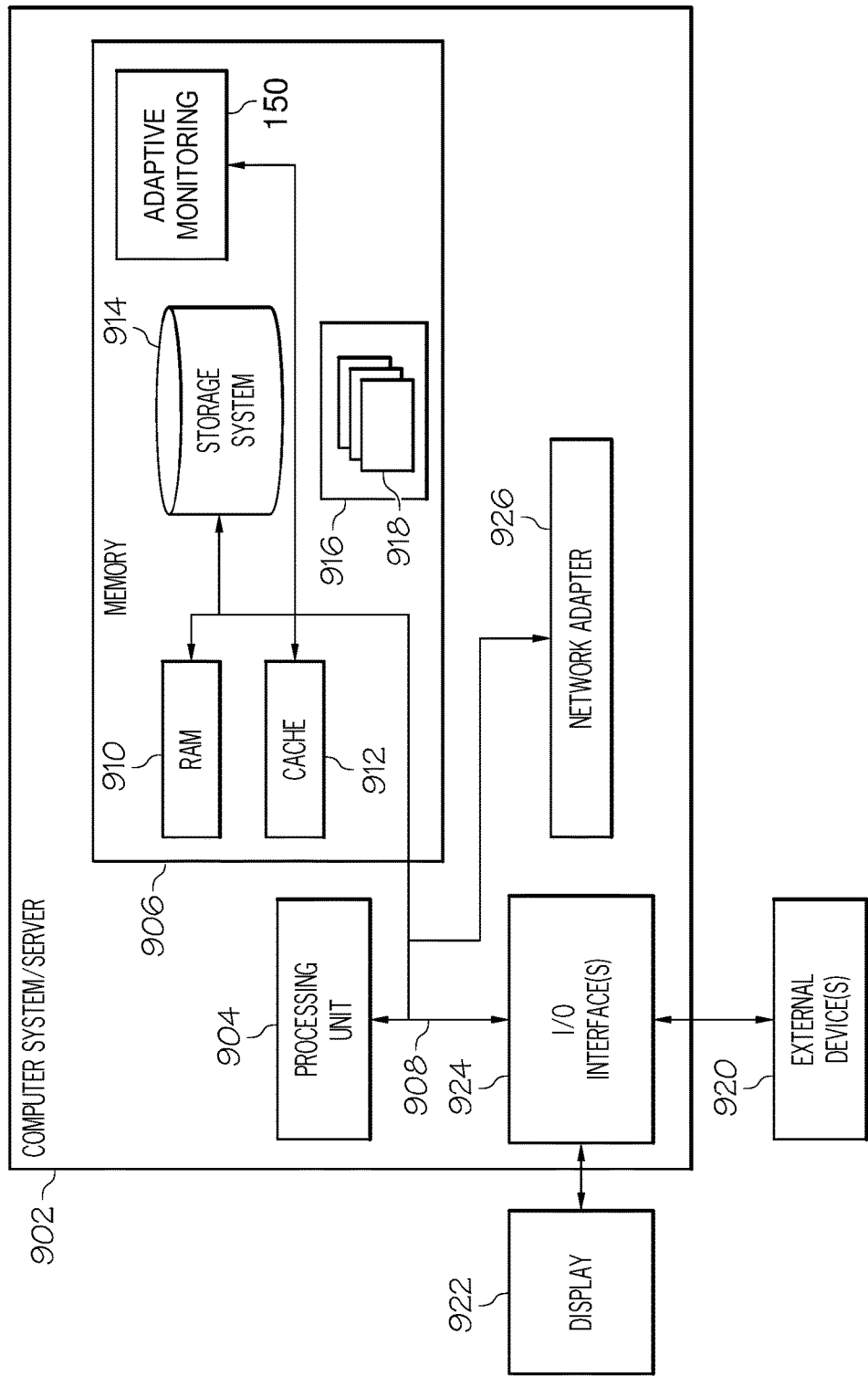
FIG. 9 is a block diagram illustrating a detailed view of an information processing system according to one embodiment of the present invention.

Information Processing System Example—FIG. 9

FIG. 9 illustrates one example of an information processing system 902 that can be utilized in various embodiments of the present disclosure. The information processing system 902 shown in FIG. 9 is only one example of a suitable system and is not intended to limit the scope of use or functionality of embodiments of the present disclosure described above. The information processing system 902 of FIG. 9 is capable of implementing and/or performing any of the functionality set forth above. Any suitably configured processing system can be used as the information processing system 902 in embodiments of the present disclosure.

The information processing system 902 is operational with numerous other general purpose or special purpose computing system environments or configurations. Examples of well-known computing systems, environments, and/or configurations that may be suitable for use with the information processing system 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The information processing system 902 may be described in the general context of computer system-executable instructions, such as program modules, being executed by a computer system. Generally, program modules may include routines, programs, objects, components, logic, data structures, and so on that perform particular tasks or implement particular abstract data types. The information processing system 902 may be practiced in various computing environments such as conventional and distributed cloud computing environments where tasks are performed by remote processing devices that are linked through a communications network. In a distributed cloud computing environment, program modules may be located in both local and remote computer system storage media including memory storage devices.

As illustrated in FIG. 9, the information processing system 902 is in the form of a general-purpose computing device. The components of the information processing system 902 can include, but are not limited to, one or more processor devices or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 906, in one embodiment, includes the adaptive monitoring processor 150 and its components discussed above. Even though FIG. 9 shows the adaptive monitoring processor 150 as a processing device residing in the main memory, the adaptive monitoring processor 150 or at least one of its components can reside within the processor 904, be a separate hardware component, and/or be distributed across a plurality of information processing systems and/or processors.

The system memory 906 can also include computer system readable media in the form of volatile memory, such as random access memory (RAM) 910 and/or cache memory 912. The information processing system 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present invention.

Program/utility 916, having a set of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of embodiments of the present disclosure.

The information processing system 902 can also communicate with one or more external devices 920 such as a keyboard, a pointing device, a display 922, etc.; one or more devices that enable a user to interact with the information processing system 902; and/or any devices (e.g., network card, modem, etc.) that enable computer system/server 902 to communicate with one or more other computing devices. Such communication can occur via I/O interfaces 924. Still yet, the information processing system 902 can communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. Other hardware and/or software components can also be used in conjunction with the information processing system 902. Examples include, but are not limited to: microcode, device drivers, redundant processing units, external disk drive arrays, RAID systems, tape drives, and data archival storage systems.

Figure 10:
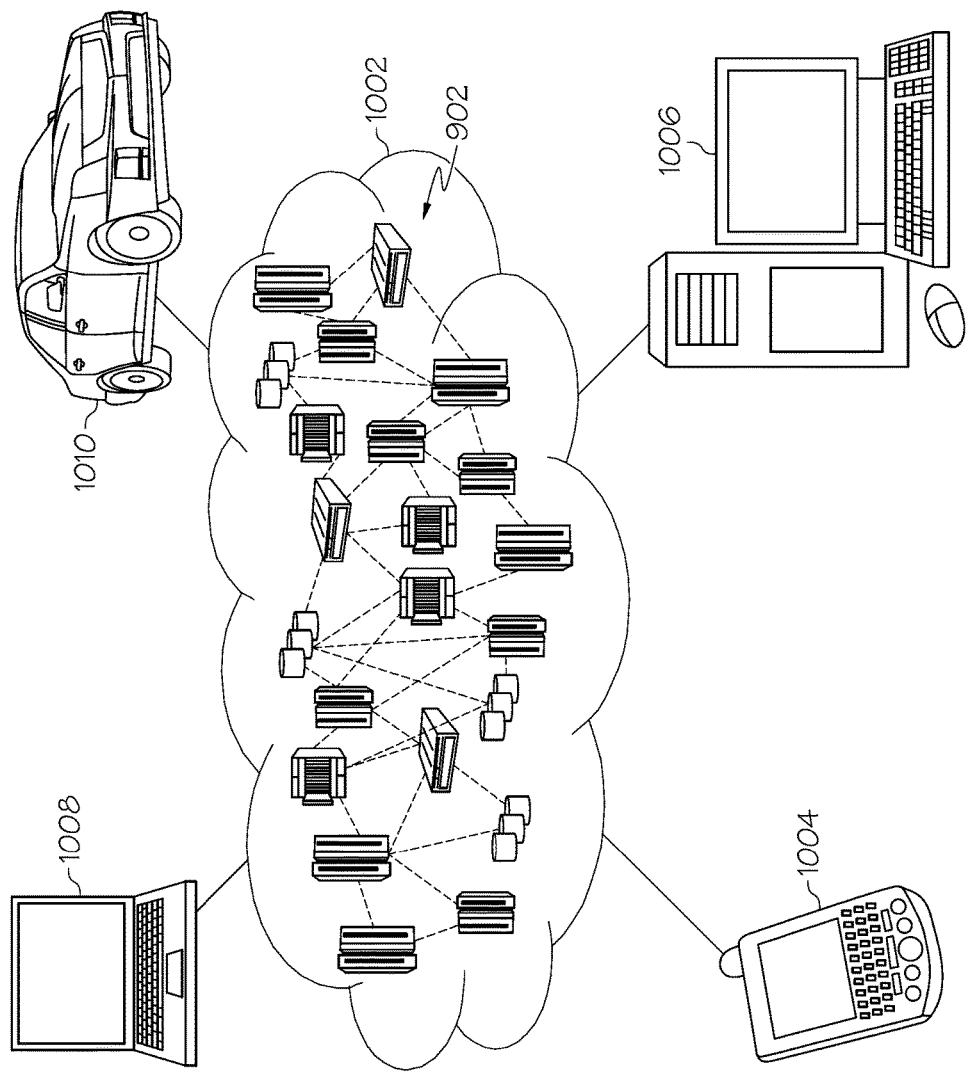
FIG. 10 illustrates one example of a cloud computing environment according to one example of the present invention.

Cloud Environment—FIG. 10

It is understood in advance that although the following is a detailed discussion on cloud computing, implementation of the teachings recited herein are not limited to a cloud computing environment. Rather, various embodiments of the present disclosure are capable of being implemented in conjunction with any other type of computing environment now known or later developed. For example, various embodiments of the present invention are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an Information Disclosure Statement (IDS) filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication.

It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or by a third party, and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, illustrative cloud computing environment 1002 is depicted. As shown, cloud computing environment 1002 includes one or more information processing systems 902 with which local computing devices used by cloud consumers, such as, for example, personal digital assistant (PDA) or cellular telephone 1004, desktop computer 1006, laptop computer 1008, and/or automobile computer system 1010 may communicate. Each node within the environment 1002 may communicate with one another. They may be grouped (not shown) physically or virtually, in one or more networks, such as Private, Community, Public, or Hybrid clouds as described hereinabove, or a combination thereof. This allows cloud computing environment 1002 to offer infrastructure, platforms and/or software as services for which a cloud consumer does not need to maintain resources on a local computing device. It is understood that the types of computing devices 1004, 1006, 1008, 1010 shown in FIG. 10 are intended to be illustrative only and that computing nodes 902 and cloud computing environment 1002 can communicate with any type of computerized device over any type of network and/or network addressable connection (e.g., using a web browser).

Figure 11:
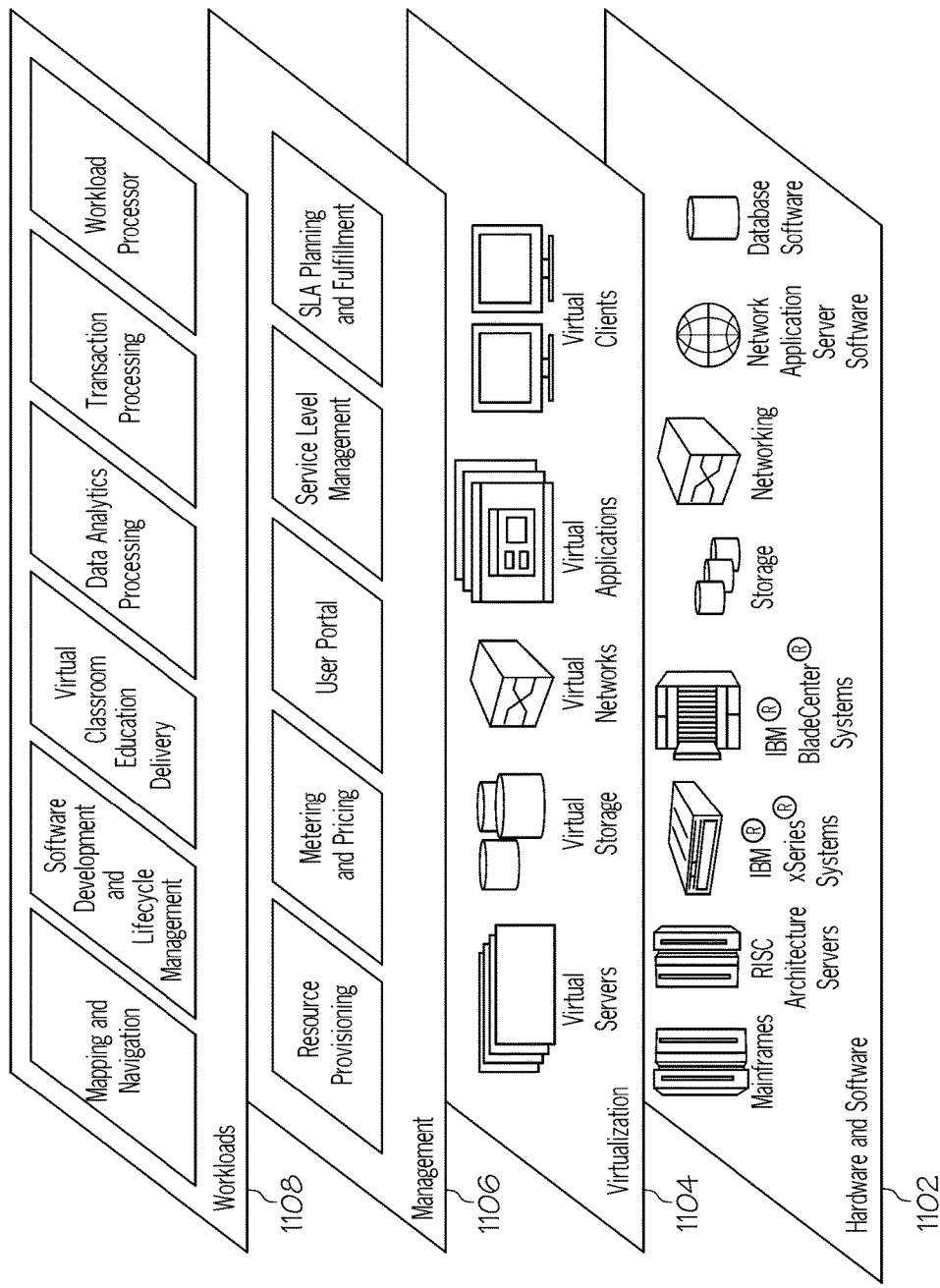
FIG. 11 illustrates abstraction model layers according to one example of the present invention.

Referring now to FIG. 11, a set of functional abstraction layers provided by cloud computing environment 1002 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload processing.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. The embodiment was chosen and described to best explain the principles of the disclosure and the practical application, and to enable others of ordinary skill in the art to understand the invention for various embodiments with various modifications as are suited to the particular use contemplated.

What is claimed is:

1. A method for adaptive performance monitoring of an enterprise-level distributed system, comprising:
   using a processor device in operative communication with a performance test tool, performing:
      prior to run time, initializing low default monitoring levels at logging points distributed across a plurality of system nodes comprising multiple hardware and software components in the enterprise-level distributed system handling thousands of concurrent users;
      initializing a rules set with a set of rules associated with a plurality of system nodes under evaluation, wherein the rules specify, for each of the plurality of system nodes:
         at least one performance goal expressed as a business rule tied to a service level agreement;
         associated with the at least one performance goal, a monitoring adjustment to perform in event of a rule failure, the monitoring adjustment defining a required change in monitoring output at the logging points associated with the system node to capture an increased amount of monitoring data, wherein the monitoring adjustment specifies a number of monitoring logging levels to increase; and
         a specified period of time to maintain the monitoring adjustment, after which time the monitoring logging levels revert to their low default monitoring levels so as not to deleteriously affect system performance;
      storing the rules set in a data store; and
      iteratively performing at pre-determined intervals during run-time for each system node under evaluation:
         using the performance test tool, collecting monitoring data from the logging points;
         analyzing the monitoring data to derive performance metrics;
         accessing the rules set;
         performing a comparison between the derived performance metrics and the at least one performance goal in the rules set to determine if the rule failure has occurred;
         matching the performance goal associated with the rule failure to its associated monitoring adjustment;
         automatically performing the associated monitoring adjustment stated in the rules set; and
         automatically reverting to the default monitoring levels after the specified period of time has elapsed.

2. The method of claim 1 wherein automatically performing the associated monitoring adjustment comprises:
   adjusting the monitoring output for the system node associated with the rule failure.

3. The method of claim 1 further comprising:
   adding a filter to the rules set to produce a complex rule incorporating additional calculations depending on severity of the rule failure;
   wherein automatically performing the associated monitoring adjustment further comprises:
      applying the filter to determine whether the derived performance metrics fail to meet the at least one performance goal by a specified threshold amount; and
      further changing the monitoring output to a maximum level during run-time, responsive to the determining.

4. The method of claim 3 wherein further changing the monitoring output comprises at least one of: adjusting sampling size, adjusting workload, adding logging points, and adjusting the pre-determined intervals.

5. The method of claim 1 wherein collecting the monitoring data comprises collecting monitoring data measuring at least one of: cpu utilization, deadlock occurrences, and access response times.

6. The method of claim 1 further comprising updating the rules set based on monitoring results.

7. An information processing system for adaptive performance monitoring of a distributed system, the information processing system comprising:
   a memory;
   a processor communicatively coupled to the memory and a performance test tool, the processor being configured to perform a method comprising:
      initializing low default monitoring levels at logging points prior to run-time;
      initializing a rules set with a set of rules associated with a plurality of system nodes under evaluation, wherein the rules specify, for each of the plurality of system nodes:
         at least one performance goal expressed as a business rule tied to a service level agreement;
         associated with the at least one performance goal, a monitoring adjustment to perform in event of a rule failure, the monitoring adjustment defining a required change in monitoring output at the logging points associated with the system node to capture an increased amount of monitoring data, wherein the monitoring adjustment specifies a number of monitoring logging levels to increase; and
         a specified period of time to maintain the monitoring adjustment, after which time the monitoring logging levels revert to their low default monitoring levels so as not to deleteriously affect system performance;
      storing the rules set in a data store; and
      iteratively performing at pre-determined intervals during run-time for each system node under evaluation:

using the performance test tool, collecting monitoring data from the logging points;
analyzing the monitoring data to derive performance metrics;
accessing rules set;
performing a comparison between the derived performance metrics and the at least one performance goal in the rules set to determine if the rule failure has occurred;
matching the performance goal associated with the rule failure to its associated monitoring adjustment;
automatically performing the associated monitoring adjustment stated in the rules set; and
automatically reverting to the default monitoring levels after the specified period of time has elapsed.

8. The information processing system of claim 7 wherein the monitoring data measures at least one of: cpu utilization, deadlock occurrences, and access response times.

9. The information processing system of claim 7 wherein the monitoring adjustment comprises at least one of: adjusting sampling size, adjusting workload, adding logging points, and adjusting the pre-determined intervals.

10. The information processing system of claim 7 wherein the method for automatically performing the associated monitoring adjustment comprises:
increasing the monitoring output for the system node reporting the rule failure.

11. The information processing system of claim 10 further comprising:
a filter added to the rules set to produce a complex rule incorporating additional calculations depending on severity of the rule failure;
wherein the method for automatically performing the associated monitoring adjustment further comprises:
applying the filter to determine whether the derived performance metrics fail to meet the at least one performance goal by a specified threshold amount; and
further changing the monitoring output to a maximum level during run-time, responsive to the determining.

12. The information processing system of claim 7 wherein the method further comprises updating the rules set based on monitoring results.

13. A computer program product for adaptive performance monitoring of a distributed system, the computer program product comprising:
a non-transitory storage medium readable by a processing circuit and storing instructions for execution by the processing circuit for performing a method comprising:
initializing low default monitoring levels at logging points prior to run-time;
initializing a rules set with a set of rules associated with a plurality of system nodes under evaluation, wherein the rules specify, for each of the plurality of system nodes:
at least one performance goal expressed as a business rule tied to a service level agreement;
associated with the at least one performance goal, a monitoring adjustment to perform in event of a rule failure, the monitoring adjustment defining a required change in monitoring output at logging points associated with the system node to capture an increased amount of monitoring data, wherein the monitoring adjustment specifies a number of monitoring logging levels to increase; and
a specified period of time to maintain the monitoring adjustment, after which time the monitoring logging levels revert to their default monitoring levels so as not to deleteriously affect system performance;
storing the rules set in a data store; and
iteratively performing at pre-determined intervals during run-time for each system node under evaluation:
using a performance test tool, collecting monitoring data from the logging points;
analyzing the monitoring data to derive performance metrics;
accessing the rules set;
performing a comparison between the derived performance metrics and the at least one performance goal in the rules set to determine if the rule failure has occurred;
matching the performance goal associated with the rule failure to its associated monitoring adjustment;
automatically performing the associated monitoring adjustment stated in the rules set; and
automatically reverting to the default monitoring levels after the specified period of time has elapsed.

14. The computer program product of claim 13 wherein the method for automatically performing the associated monitoring adjustment comprises:
increasing the monitoring output for the system node associated with the rule failure.

* * * * *